(12) United States Patent
Remy et al.

(10) Patent No.: US 11,919,274 B2
(45) Date of Patent: Mar. 5, 2024

(54) PERMEABLE MATERIALS CAPABLE OF LIGHTNING STRIKE PROTECTION AND USE THEREOF IN RESIN INFUSION PROCESSING

(71) Applicant: Cytec Industries Inc., Princeton, NJ (US)

(72) Inventors: Bérénice Remy, Wrexham (GB); Junjie Jeffrey Sang, Newark, DE (US); Samuel J. Hill, Chester (GB); Carmelo Luca Restuccia, Chester (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 360 days.

(21) Appl. No.: 16/832,313

(22) Filed: Mar. 27, 2020

(65) Prior Publication Data

US 2020/0307162 A1 Oct. 1, 2020

Related U.S. Application Data

(60) Provisional application No. 62/825,951, filed on Mar. 29, 2019.

(51) Int. Cl.
*B32B 15/14* (2006.01)
*B32B 3/10* (2006.01)
(Continued)

(52) U.S. Cl.
CPC ............... *B32B 15/14* (2013.01); *B32B 3/10* (2013.01); *B32B 5/022* (2013.01); *B32B 5/26* (2013.01);
(Continued)

(58) Field of Classification Search
CPC ......... B32B 15/02; B32B 15/08; B32B 15/14; B32B 15/20; B32B 2250/03;
(Continued)

(56) References Cited

U.S. PATENT DOCUMENTS

| 7,084,213 B2 | 8/2006 | Carter |
| 8,927,662 B2 | 1/2015 | Carter |

(Continued)

FOREIGN PATENT DOCUMENTS

| EP | 0522663 A1 | 1/1993 |
| WO | 2017117383 A1 | 10/2009 |

(Continued)

*Primary Examiner* — Alicia J Weydemeyer
(74) *Attorney, Agent, or Firm* — Thi Dang

(57) ABSTRACT

A permeable LSP material that can be incorporated into a resin infusion process such as RTM and VaRTM. This permeable LSP material may be in the form of an elongated or continuous tape that can be used in an automated placement process such as ATL and AFP. In one embodiment, the permeable LSP material includes at least the following components: (a) a nonwoven veil of randomly arranged fibers; (b) a porous electrically conductive layer having openings through its thickness; and (c) a resin material distributed, in a non-continuous manner, throughout the nonwoven veil 11 and between the nonwoven veil and the porous conductive layer. The permeable LSP material can be brought into contact with a dry preform, followed by resin infusion and curing to form a hardened composite part having the LSP material integrated therein.

15 Claims, 5 Drawing Sheets

(51) Int. Cl.
*B32B 5/02* (2006.01)
*B32B 5/26* (2006.01)
*B32B 7/14* (2006.01)
*B32B 15/02* (2006.01)
*B32B 27/12* (2006.01)
*B32B 27/38* (2006.01)

(52) U.S. Cl.
CPC ............... *B32B 7/14* (2013.01); *B32B 15/02* (2013.01); *B32B 27/12* (2013.01); *B32B 27/38* (2013.01); *B32B 2250/03* (2013.01); *B32B 2250/05* (2013.01); *B32B 2250/40* (2013.01); *B32B 2262/101* (2013.01); *B32B 2307/202* (2013.01); *B32B 2307/726* (2013.01); *B32B 2311/12* (2013.01)

(58) Field of Classification Search
CPC ............ B32B 2250/05; B32B 2250/40; B32B 2260/021; B32B 2260/023; B32B 2260/046; B32B 2262/02; B32B 2262/0246; B32B 2262/0253; B32B 2262/0261; B32B 2262/0269; B32B 2262/0276; B32B 2262/0292; B32B 2262/101; B32B 2262/106; B32B 2262/14; B32B 2264/0214; B32B 2264/102; B32B 2264/104; B32B 2264/107; B32B 2307/202; B32B 2307/726; B32B 2311/12; B32B 2571/00; B32B 2605/18; B32B 27/12; B32B 27/38; B32B 3/10; B32B 3/266; B32B 5/022; B32B 5/08; B32B 5/10; B32B 5/26; B32B 7/12; B32B 7/14; B64D 45/02

See application file for complete search history.

(56) References Cited

U.S. PATENT DOCUMENTS

| | | | |
|---|---|---|---|
| 2009/0258220 | A1 | 10/2009 | Nguyen |
| 2015/0174860 | A1* | 6/2015 | Ellis ................. B32B 3/266 428/220 |
| 2015/0375461 | A1* | 12/2015 | Blackburn ............ B32B 5/022 428/114 |
| 2018/0361689 | A1* | 12/2018 | Elilis .................... B32B 15/092 |

FOREIGN PATENT DOCUMENTS

| | | |
|---|---|---|
| WO | 2014088866 A1 | 6/2014 |
| WO | 2017095810 A1 | 6/2017 |
| WO | 2017108488 A1 | 6/2017 |

* cited by examiner

PERMEABLE MATERIALS CAPABLE OF
LIGHTNING STRIKE PROTECTION AND
USE THEREOF IN RESIN INFUSION
PROCESSING

The instant application claims the benefit of prior U.S. Provisional Application No. 62/825,951 filed on Mar. 29, 2019, the content of which is incorporated herein by reference in its entirety.

The present disclosure generally relates to materials for providing lightning strike protection (LSP) to composite parts.

DETAILED DESCRIPTION

Figure 1:
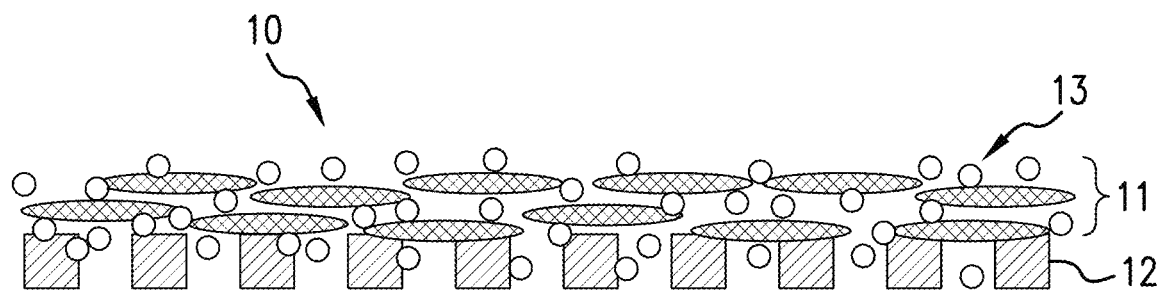
FIG. 1 illustrates a permeable LSP material that can be incorporated into a resin infusion process according to one embodiment.

Fiber-reinforced, polymer matrix composite (PMC) is a high-performance structural material composed reinforcement fibers impregnated in a polymer matrix. PMC materials are commonly used in applications requiring resistance to aggressive environments, high strength, and/or low weight. Examples of such applications include aircraft components, e.g., tails, wings, fuselages, and propellers, automobiles, boat hulls, and bicycle frames.

Materials used in the fabrication of aerospace component parts such as fuselage and wings must have certain characteristics to protect the parts from damage or hazards caused by common environmental occurrences. Lightning is an example of a common environmental occurrence that can severely damage and/or punch through component parts if such parts are not adequately conductive and grounded through the aircraft. If lightning strikes a wing component of an aircraft during flight, the event has the potential of causing a dangerous surge current in addition to causing serious physical damage of the component itself. The surge current is particularly concerning because it may eventually come into contact with a fuel reservoir causing an explosion to occur.

To provide lightning strike protection (LSP) to a composite part made of PMC material, different ways of enhancing the conductivity of the composite part have been used. A conventional method for imparting LSP to component parts in the aerospace industry is to incorporate metal mesh, screen, expanded metal foil, or woven wire fabrics into the composite part.

Such LSP material can be incorporated during the manufacturing of the composite part. Composite parts can be manufactured using different methods, one of which is prepreg processing. Prepregs are typically sheets of reinforcement fibers impregnated with a matrix resin, e.g., epoxy-based resin. To form a composite part, the prepregs are cut to size and laid up on a mold. The metal LSP material can be incorporated as a single conductive layer between the prepreg layup and an outer surfacing film, or by embedding the conductive layer in the surfacing film. For aerospace applications, such surfacing film is often incorporated into the composite part to improve the surface quality thereof. Surfacing films are typically epoxy-based films and can be co-cured with the prepreg layup during the manufacturing of the composite parts. Once in place, the prepreg layup together with the conductive layer and surfacing film are enclosed under a vacuum bag and thermally cured under pressure to produce the final composite part. The prepregs to be molded into a composite part have the advantage of ease of use and high reliability. However, they also have the disadvantage of having limited drapability (i.e., ability to drape).

For manufacturing composite parts with more complex shapes, resin infusion processes such as Resin Transfer Molding (RTM) and Vacuum-assisted Resin Transfer Molding (VARTM) have been used. During the RTM process, a dry preform is placed in an enclosed mold cavity, and a liquid resin is injected into the cavity under pressure. The dry preform is a shaped structure containing layers of dry reinforcement fibers and/or fabric plies, which may be held together with a small amount of a binder. The mold containing the preform therein is often put under vacuum so that the vacuum removes all the entrapped air in the preform and speeds up the RTM process. Once the liquid resin fills the mold cavity, the resin is cured, resulting in the formation of a hardened composite part. VARTM is similar to RTM except that a single-sided tool is normally used. In general, the VARTM process includes: enclosing a preform on a tool surface with a vacuum bag, which is a flexible, fluid impermeable covering; drawing vacuum between the tool and the bag, thereby causing the bag to compress against the preform; and introducing liquid resin into the evacuated bag through one or more resin supply lines or conduits. Such resin infusion processes are especially useful in the manufacturing complex-shaped structures which are otherwise difficult to manufacture using conventional prepreg technologies.

Traditionally, the dry preform for forming the composite part via liquid resin infusion is prepared by a manual lay-up operation, wherein superimposed layers of dry fibrous materials are laid up on a tool that defines substantially the shape of the composite part. The layers of fibrous materials may be in the form of nonwoven or woven fabrics, for example, non-crimped fabrics (NCF), which have not been pre-impregnated with resin. While laying up the layers onto the tool, the operator must be careful to make them adopt to the shape of the tool without inducing wrinkling or bridges. Moreover, to incorporate an integrated LSP conductive material via the resin infusion process, a single conductive layer such as an expanded metal foil is typically placed on the tool surface before laying up the dry preform, and the entire assembly is then infused with resin. The resin-infused preform together with the metal foil is cured to form a hardened composite part having a LSP metal layer integrated therein. Such manual operation is laborious and slow as the expanded metal foil is a very delicate material, which can easily be distorted and wrinkle, altering the final surface quality.

It would be desirable to form a layup of dry preform by an automated placement process such as Automated Tape Laying (ATL) and Automated Fiber Placement (AFP) and to incorporate the LSP material into such automated process to increase manufacturing speed, efficiency and quality, and thereby reducing manufacturing costs.

Disclosed herein is a permeable LSP material that can be incorporated into a resin infusion process, particularly VARTM. This permeable LSP material may be in the form of an elongated or continuous tape that can be used in an automated placement process such as ATL and AFP. In some embodiments, the LSP material is configured to improve the surface quality of the final composite structures as well as providing protection against lightning strike, electrostatic discharge (ESD), and electromagnetic interference (EMI).

According to one embodiment illustrated by FIG. 1, the LSP material 10 is a permeable material composed of at least the following components: (a) a nonwoven veil 11 of randomly arranged fibers; (b) a porous electrically conductive layer 12 having openings through its thickness; and (c) a resin material 13 distributed, in a non-continuous manner, throughout the nonwoven veil 11 and between the nonwoven veil 11 and the conductive layer 12. The porous conductive layer 12 adheres to one side of the nonwoven veil 11 due to the presence of the resin material 13 between them. The porous conductive layer 12 will be facing or in contact with the preform to be infused with resin during the manufacturing of a composite part.

In reference to the resin material, "non-continuous manner" means that the resin material does not form a continuous resin film covering a major surface of the nonwoven veil or a major surface of the conductive layer in a manner that would prevent fluids, liquid or air, from flowing through the thickness of the veil or through the thickness of the conductive layer. The resin material is distributed such that the resin-containing nonwoven veil remains porous and most (i.e., more than half) or all of the openings in the conductive layer are not completely blocked. As such, liquids, particularly, liquid resins used in RTM and VARTM, can flow through the thickness of the LSP material during resin infusion to form a fully embedded LSP solution. Also, air initially entrapped in the initial dry preform can be evacuated during the outgassing process, a process in which the dry preform is heated to remove any volatiles, moisture entrapped in the preform.

Figure 2:
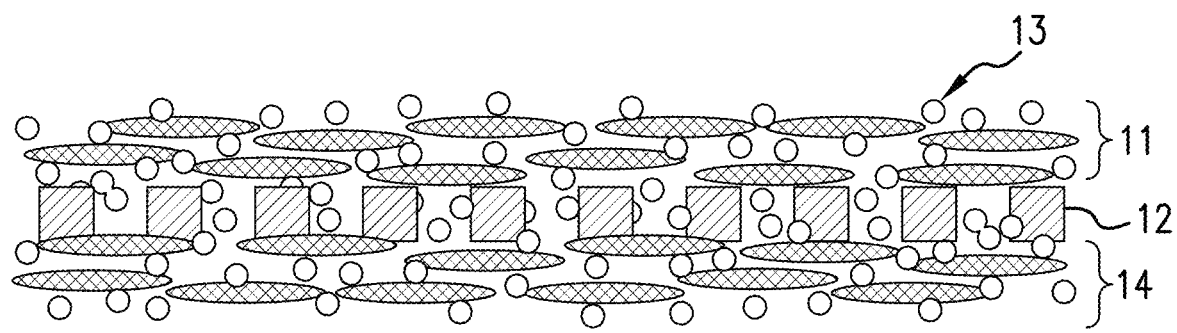
FIG. 2 illustrates a permeable LSP material according to another embodiment.

In another embodiment illustrated by FIG. 2, the porous conductive layer 12 (as described in reference to FIG. 1) is sandwiched between two nonwoven veils 11 and 14, and the resin material 13 is distributed, in a non-continuous manner, throughout the nonwoven veils 11, 14 and on the conductive layer 12. The non-continuous presence of the resin material is as described in reference to FIG. 1. Some of the resin material may penetrate through the openings (or perforations) of the conductive layer 12 but the resin material does not completely fill in all openings. As such, the laminated structure shown in FIG. 2 remains a porous and fluid permeable structure, through which liquid resin can easily flow. In this embodiment, either of the resin-containing veils (11, 14) will be in contact with the preform to be infused with resin during composite part manufacturing.

In the embodiments shown in FIGS. 1 and 2, each nonwoven veil (11, 14), without resin material, is a thin, light-weight structure with an areal weight in the range of 3-50 gsm, or 4-15 gsm. "gsm" refers to $g/m^2$. Each nonwoven veil may be composed of continuous or chopped fibers made of glass, carbon, or polymers such as thermoplastic polymers. The nonwoven veil may be composed of different types fibers, i.e., fibers of different materials. Thermoplastic fibers are suitable, including fibers made of polyamides (such as aliphatic polyamides (PA), cycloaliphatic polyamides, aromatic polyamides, polyphthalamides (PPA), ether or ester block polyamides (PEBAX, PEBA)), polyphenylenesulfides (PPS), polyetherimides (PEI), polyimides (PI), polyamidoamides (PAI), polysulfones, including polyarylsulfones (such as polyethersulfone (PES), polyethersulfone-etherethersulfone (PES:PEES), polyetherethersulfone (PEES)), polyaryletherketone (PAEK) (such as polyetherketone (PEK), polyetheretherketone (PEEK)), polyurethanes, including thermoplastic polyurethanes, polycarbonates, polyacetals, polyphenyleneoxides (PPO), polyesters, polyethers, polyethernitriles, polybenzimidazoles, liquid crystal polymers (LCPs), combinations and copolymers thereof.

In the embodiments shown in FIGS. 1 and 2, the porous conductive layer 12 (without resin material) may be an expanded metal foil or metal screen or metal mesh, preferably, with an areal weight within the range of about 50 gsm to 850 gsm, or 60 gsm to 350 gsm, or 60 gsm to 195 gsm. The conductive layer may be a perforated metal foil (in sheet form) with perforations through its thickness and a thickness in the range of 3 µm to 300 µm. The perforations may have any suitable cross-sectional shape such as circular or elliptical. Suitable metals may be selected from: copper, aluminum, bronze, titanium, alloys and combinations thereof. In one embodiment, the porous conductive layer is a perforated copper foil with thickness in the range of 10 µm-75 µm, or an areal weight in the range of 60 gsm-350 gsm.

In the embodiment shown in FIG. 1, the resin material 13 is present in an amount in the range of 20 gsm to 75 gsm, or 25 gsm to 50 gsm. In the embodiment shown in FIG. 2, the total amount of resin material in the LSP material is 40 gsm to 150 gsm, or 50 gsm to 100 gsm. The resin material is a curable resin containing one or more thermoset resins. The resin material's composition will be described in more details below.

Figure 3:
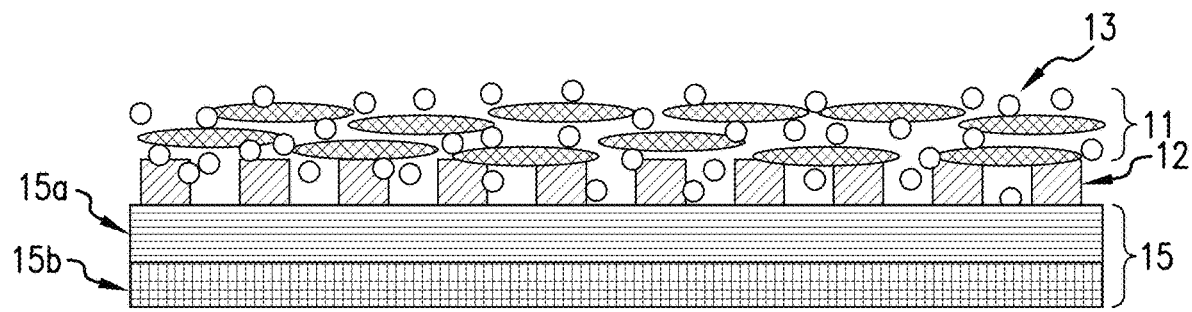
FIG. 3 illustrates a permeable LSP material according to yet another embodiment.

In another embodiment illustrated by FIG. 3, the LSP material as described in reference to FIG. 1 is adhered to a reinforcement textile 15. The reinforcement textile 15 is composed of a layer of unidirectional (UD) reinforcement fibers 15a attached to a nonwoven veil 15b. The UD reinforcement fibers 15a shown in FIG. 3 are adherent to the perforated conductive layer 12. Alternatively, the veil side 15b of the reinforcement textile 15 may be adherent to the perforated conductive layer 12. The reinforcement textile 15 functions as a stiffening material, which prevents the "accordion" effect during slitting of a broad LSP material into narrow-width tapes or during the automated placement of the LSP tapes. The "accordion" effect refers to the wrinkling and bunching of the tape. The reinforcement textile 15 also functions as a first reinforcement layer during an automated placement process to build up a preform. As such, the lay down of the LSP material and the first or last reinforcement ply is carried out in one-step, instead of two separate steps, thereby reducing the overall processing time.

Figure 4:
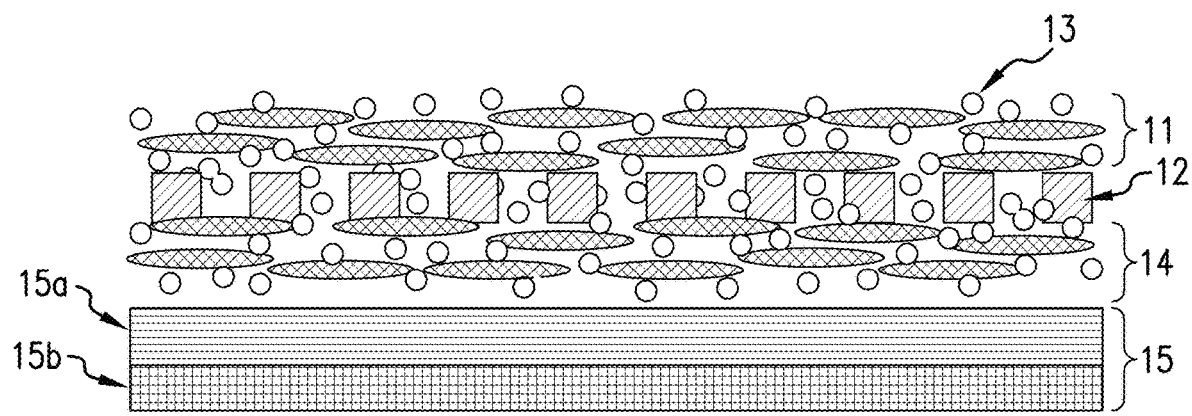
FIG. 4 illustrates a permeable LSP material according to yet another embodiment.

In yet another embodiment illustrated by FIG. 4, the LSP material as described in reference to FIG. 2 is adhered to a reinforcement textile 15. The reinforcement textile 15 is as described for FIG. 3. Again, either the UD fibers 15a or the veil 15b may be in contact with the resin-containing veil 13.

In the embodiments illustrated by FIGS. 3 and 4, the reinforcement textile 15 will be in contact with the preform to be infused with resin during the manufacturing of a composite part.

In the configurations of FIGS. 3 and 4, the resin material 13 may be replaced by a binder, which is a solid at a temperature of up to 50° C., has a softening point at a temperature in the range of 65° C. to 125° C. as measured by Differential Scanning calorimetry (DSC). This solid binder contains a blend of epoxy resin and thermoplastic polymer, but is void of any catalyst or cross-linking agent which is active above 65° C. When such solid binder is used, the amount of binder in the LSP multilayered structure shown in FIG. 3 or FIG. 4 may be in the range of 5 gsm to 20 gsm in total.

The multi-layered LSP materials described in reference to FIGS. 1-4 may be in the form of a flexible tape, which is lightweight and is configured for an automated placement process such as ATL or AFP. Due to its flexibility and lightweight property, such LSP tape can be laid down at a significantly faster rate as compared to conventional resin-impregnated prepreg tapes. The LSP tape may have a width of about 0.125 in to about 12 in (or about 3.17 mm to about 305 mm). In some embodiments, the LSP tape has a width of about 0.125 in to about 1.5 in (or about 3.17 mm to about 38.1 mm), or about 0.25 in to about 0.50 in (or about 6.35 mm to about 12.77 mm). In other embodiments, the LSP tape has a width of about 6 in to about 12 in (or about 152 mm to about 305 mm). The length of the tape is continuous or is very long relative to its width, for example, at least 10 times its width, in some cases, 100-100,000 times its width. In continuous form, the surfacing tape can be wound up into a roll for storage before its application in an automated process.

ATL and AFP are processes that use computer-guided robotics to lay down continuous tapes onto a mold surface (e.g., a mandrel) to build up a composite structure or fibrous preform. The ATL/AFP process involves dispensing one or more tapes side by side onto a tool surface to create a layer of desired width and length, and then additional layers are built up onto a prior layer to provide a layup with a desired thickness. The subsequent tapes may be oriented at different angles relative to prior tapes. The ATL/AFP system is typically equipped with a robotically controlled head for dispensing and compacting the tapes directly onto the tool surface.

Resin Material

The resin material in the LSP materials of the present disclosure is tacky at room temperature (20° C.-25° C.), thereby providing the LSP material with a tacky surface on one or both sides thereof. The term "tacky" as used in reference to the resin material means that it is sticky to the touch and can easily adhere to another surface. The tacky property of the resin material ensures that the LSP material remains in place when it is placed onto a tool surface or is laminated onto another substrate such as a dry fibrous preform, without having to apply heat. Such tacky property is advantageous in automated placement processes such as ATL and AFP.

The tacky resin material described in various embodiments herein, particularly in reference to FIGS. 1 and 2, is formed from a curable resin composition containing one or more thermoset resins. Examples of suitable thermoset resins include, but are not limited to, epoxies, phenolic resins, cyanate esters, bismaleimides, benzoxazines (including polybenzoxazines), unsaturated polyesters, vinyl ester resins, and combinations thereof.

In preferred embodiments, the curable resin composition contains one or more epoxy resins and at least one curing agent. Epoxy resins include mono-functional and multifunctional epoxies. Multifunctional epoxy resin (or polyepoxide) contains two or more epoxy functional groups per molecule.

Examples of suitable multifunctional epoxy resins include the polyglycidyl ethers, which are prepared by reaction of epichlorohydrin or epibromohydrin with a polyphenol in the presence of alkali. Suitable polyphenols are, for example, resorcinol, pyrocatechol, hydroquinone, bisphenol A (bis(4-hydroxyphenyl)-2,2-propane), bisphenol F(bis(4-hydroxyphenyl)methane), bis(4-hydroxyphenyl)-1,1-isobutane, 4,4'-dihydroxybenzophenone, bis(4-hydroxyphenyl)-1,1-ethane, and 1,5-hydroxynaphthalene.

Also included are the polyglycidyl ethers of polyalcohols. Such polyalcohols include ethylene glycol, diethylene glycol, triethylene glycol, 1,2-propylene glycol, 1,4-butylene glycol, triethylene glycol, 1,5-pentanediol, 1,6-hexanediol, and trimethylolpropane. Additional epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxies may include those derived from the epoxidation products of olefinically-unsaturated cycloaliphatic compounds or from natural oils and fats.

Also included are liquid epoxy resins which are reaction products of bisphenol A or bisphenol F and epichlorohydrin. These epoxy resins are liquid at room temperature and generally have epoxy equivalent weight (g/eq) of from about 150 to about 480 as determined by ASTM D-1652.

Particularly suitable are epoxy novolac resins which are polyglycidyl derivatives of phenol-formaldehyde novolacs or cresol-formaldehyde novolacs having the following chemical structure:

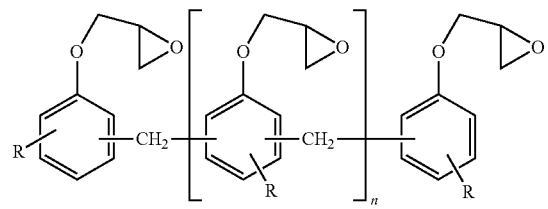

wherein n=0 to 5, and R=H or $CH_3$. When R=H, the resin is a phenol novolac resin. When R=$CH_3$, the resin is a cresol novolac resin. The former is commercially available as DEN™ 428, DEN™ 431, DEN™ 438, DEN™ 439, and DEN™ 485 from Dow Chemical Co. The latter is commercially available as ECN 1235, ECN 1273, and ECN 1299 from Ciba-Geigy Corp. Other suitable novolacs that may be used include SU-8 from Celanese Polymer Specialty Co. In a preferred embodiment, the epoxy novolac resin has a viscosity of 4000-10,000 mPa·s at 25° C. and epoxide equivalent weight (EEVV) of about 190 g/eq to about 235 g/eq as determined by ASTM D-1652.

A particularly suitable multifunctional epoxy resin is a tetra-functional aromatic epoxy resin having four epoxy functional groups per molecule and at least one glycidyl amine group. An example is tetraglycidyl ether of methylene dianiline having the following general chemical structure:

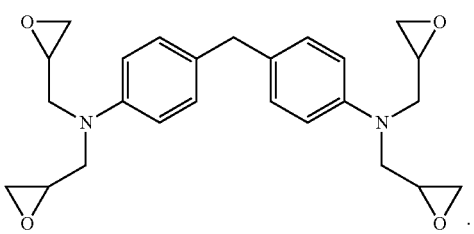 [SMILES: c1cc(N(CC2CO2)CC2CO2)ccc1Cc1ccc(N(CC2CO2)CC2CO2)cc1]

The amine groups in structure are shown in the para- or 4,4' positions of the aromatic ring structures, however, it should be understood that other isomers, such as 2,1', 2,3', 2,4', 3,3', 3,4', are possible alternatives. Examples of commercially available tetra-functional epoxy resins are Araldite® MY 9663, MY 9634, MY 9655, MY-721, MY-720, MY-725 supplied by Huntsman Advanced Materials.

Another particularly suitable multifunctional epoxy resin is a tri-functional epoxy resin, for example, triglycidyl ether of aminophenol. Specific examples of commercially available tri-functional epoxy resins are Araldite® MY 0510, MY 0500, MY 0600, MY 0610 supplied by Huntsman Advanced Materials.

Another suitable tri-functional epoxy resin is tris-(hydroxyl phenyl)-methane-based epoxy, for example, TACTIX® 742 resin supplied by Huntsman Advanced Materials having the following chemical structure:

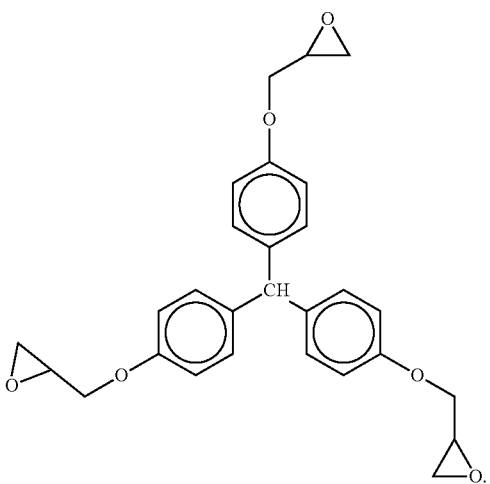

The curable resin composition may be formulated so as to yield high $T_g$ and high cross-linked density. In some embodiments, a combination of epoxy novolac resin(s) and non-novolac multifunctional epoxy resin(s), particularly, tri-functional and/or tetra-functional epoxy, is used. The relative amounts of epoxy novolac resin and non-novolac multifunctional epoxy resin may be varied but it is preferred that the amount of epoxy novolac resin is with the range of about 80 to about 100 parts per 100 parts of non-novolac multifunctional epoxy resin. The combination of epoxy novolac resin and multifunctional epoxy resin at the specified proportion contribute to the desired high $T_g$ and cross-linked density upon curing.

The multifunctional epoxide resins may be cured by a variety of latent amine-based curing agents, which are activated at elevated temperatures (e.g. temperature above 150° F. (65° C.). Examples of suitable curing agents include dicyandiamide (DICY), Diaminodiphenyl sulfone (4,4'-DDS or 3,3'-DDS), 4,4'-Methylene-bis(3-chloro-2,6-diethylaniline) (MCDEA), guanamine, guanidine, aminoguanidine, and derivatives thereof. Compounds in the class of imidazole and amine complexes may also be used. In an embodiment, the curing agent is dicyandiamide. In another embodiment, the curing agent is 4,4'-Methylene-bis(3-chloro-2,6-diethylaniline) (MCDEA). The amine-based curing agent is present in an amount within the range of about 1% to about 5% by weight based on the total weight of the resin composition.

A curing accelerator may be used in conjunction with the amine-based curing agent to promote the curing reaction between the epoxy resins and the amine-based curing agent. Suitable curing accelerators may include alkyl and aryl substituted ureas (including aromatic or alicyclic dimethyl urea), and bisureas based on toluenediamine or methylene dianiline. One example of bisurea is 4,4'-methylene bis (phenyl dimethyl urea), commercially available as Omicure® U-52 or CA 152 from CVC Chemicals, which is a suitable accelerator for dicyandiamide. Another example is 2,4-toluene bis(dimethyl urea), commercially available as Omicure® U-24 or CA 150 from CVC Chemicals. The curing accelerator may be present in an amount within the range of about 0.5% to about 3% by weight based on the total weight of the resin composition.

The terms "cure" and "curing" as used herein refer to the irreversible hardening of a pre-polymer material or a resin or monomers brought about by heating at elevated temperatures, exposure to ultraviolet light and radiation, or chemical additives. The term "curable" means can be cured into a hardened material.

The curable resin composition may further include one or more toughening agents. The toughening agents may be selected from: thermoplastic polymers, elastomers, core-shell rubber particles, a pre-react adduct which is a reaction product of an epoxy resin, a bisphenol, and an elastomeric polymer, and combinations thereof. In some embodiments, a combination of two different toughening agents from this group is used. The amount of toughening agent(s), in total, may be about 1% to about 30%, in some embodiments, about 10% to about 20%, by weight based on the total weight of the resin composition.

With regard to the pre-react adduct, suitable epoxy resins include diglycidylether of Bisphenol A, diglycidylether of tetrabromo Bisphenol A, hydrogenated diglycidyl ether of bisphenol A, or hydrogenated diglycidyl ether of bisphenol F. Also suitable are cycloaliphatic epoxies, which include compounds that contain at least one cycloaliphatic group and at least two oxirane rings per molecule. Specific examples include diepoxide of cycloaliphatic alcohol, hydrogenated Bisphenol A represented by the following structure:

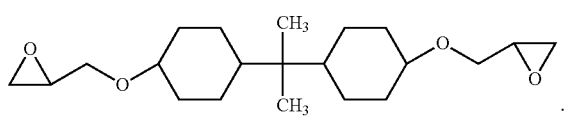

An example of such cycloaliphatic epoxy resin is EPALLOY® 5000 (a cycloaliphatic epoxy prepared by hydrogenating bisphenol A diglycidyl ether) available from CVC Thermoset Specialties. Other cycloaliphatic epoxides suitable for use in the pre-react adduct may include EPONEX™ cycloaliphatic epoxy resins, e.g. EPONEX™ Resin 1510 supplied by Momentive Specialty Chemicals.

The bisphenol in the pre-react adduct functions as a chain extension agent for the linear or cycloaliphatic epoxy. Suitable bisphenols include bisphenol A, tetrabromo bisphenol A (TBBA), Bisphenol Z, and tetramethyl Bisphenol A (TMBP-A).

Suitable elastomers for forming the pre-react adduct include, but are not limited to, liquid elastomers such as amine-terminated butadiene acrylonitrile (ATBN), carboxyl-terminated butadiene acrylonitrile (CTBN), and carboxyl-terminated butadiene (CTB). Also possible are fluorocarbon elastomers, silicone elastomers, styrene-butadiene polymers. In an embodiment, the elastomer used in the pre-react adduct is ATNB, CTBN or CTB.

Suitable thermoplastic tougheners include polyarylsulfone polymers such as polyether sulfone (PES), polyether ether sulfone (PEES). In some embodiments, the toughening agent is a copolymer of PES and PEES, which is described in U.S. Pat. No. 7,084,213.

The toughening component may be core-shell rubber (CSR) particles having particle size of 300 nm or less. The CSR particles may be any of the core-shell particles where a soft core is surrounded by a hard shell. Preferred CSR particles are those having a polybutadiene rubber core or butadiene-acrylonitrile rubber core and a polyacrylate shell. Commercial source of CSR particles includes Kane Ace™ MX 411 (a suspension of 25% by weight CSR particles in MY 721 epoxy resin), and Kane Ace™ MX 120 (containing 25%-37% by weight of CSR particles dispersed in D.E.R.™ 331 resin), and Paraloid™ EXL-2691 from Dow Chemical Co. (methacrylate-butadiene-styrene CSR particles with average particle size of about 200 nm).

Ceramic microspheres may be added to the curable resin composition. They may be hollow or solid ceramic microspheres. In one embodiment, hollow, ceramic microspheres made of an inert silica-alumina ceramic material are used. Microspheres having diameters ranging from about 0.1 μm to about 20 μm, and preferably from about 1 μm to about 15 μm, have been found to be particularly suitable. An example of commercially available ceramic microspheres which are particularly suitable for use in the present resin film composition are sold by Zeelan Industries, Inc. under the trade name Zeeospheres®, for example, G-200, G210 and W-200. These are hollow, silica-alumina spheres with thick walls, odorless, and light gray in color. In some embodiments, the amount of ceramic microspheres may be within the range of about 20% to about 40% by weight, or about 25% to about 35% by weight based on the total weight of the resin composition. In other embodiments, the amount of ceramic microspheres may be within the range of about 3% to about 15% by weight, or about 5% to about 10% by weight.

Inorganic fillers in particulate form (e.g. powder) are added to the resin composition as a rheology modifying component to control the flow of the resinous composition and to prevent agglomeration therein. Suitable inorganic fillers that may be used in the resin film composition include talc, mica, calcium carbonate, alumina, and fumed silica. In one embodiment, hydrophobic fumed silica (e.g. Cab-O-Sil® TS-720) is used as the inorganic filler. The amount of inorganic fillers may be within the range of about 1% to about 5% by weight based on the total weight of the resin composition.

The curable resin composition may further include one or more optional additives which affect one or more of mechanical, electrical, optical, and thermal properties of the cured or uncured resin material. Such additives include, but are not limited to, ultraviolet (UV) stabilizers, color pigments and dyes. When such additives are used, their total amount is less than about 5% by weight based on the total weight of the resin composition.

The non-continuous resin distribution for the purpose herein may be affected by film lamination, as an example. For the embodiment of FIG. 1, the resin material may be applied by: (i) providing an assembly of a porous conductive layer, e.g. a metal mesh, as a top layer, a nonwoven veil as the middle layer, and a thin resin film as the bottom layer; (ii) applying heat and pressure, e.g. by heated rollers, to the assembly such that the resin film becomes flowable and spreads throughout the veil and onto the conductive layer, including the interface between the veil and conductive layer. Alternatively, the resin film may be the middle layer in the assembly at step (i). Due to the low amount of resin used, such lamination does not produce a continuous resin surface on the resulting laminate, and the resulting laminate is porous and permeable to fluids, including liquids and volatiles. For the embodiment of FIG. 2, the lamination process is the same but the assembly includes a porous conductive layer between two nonwoven veils and two outer resin films, each resin film on an outer surface of each veil).

Alternatively, the nonwoven veil is placed into contact with the resin film, then heat is applied to lower the viscosity of the resin and vacuuming is applied to pull the resin through the veil. The resin spreads throughout the veil but does not form a continuous surface or continuous film on the veil such that the resulting resin-infused veil remains porous. The porous, resin-infused veil is laminated to the porous conductive layer to produce the configuration shown in FIG. 1. For the configuration of FIG. 2, a second resin-infused veil, prepared in the same manner, is laminated to the opposite side of the porous conductive layer.

As another example, the resin material may be distributed by spray coating. The non-woven veil and the porous conductive layer are separately spray coated with a resin solution followed by drying to remove the solvent. Subsequently, the resin-coated veil and the resin-coated conductive layer are laminated together to produce the configuration of FIG. 1. For the configuration of FIG. 2, a second resin-coated veil, prepared in the same manner, is laminated to the opposite side of the resin-coated conductive layer. The spray coating does not produce a continuous resin surface on the veil or on the conductive layer. As such, the resin-coated veil and the resin-coated conductive layer remain porous and permeable to liquid. Alternatively, only the nonwoven veil(s) is/are coated with the resin solution prior to laminating the veil(s) to the porous conductive layer.

For spray coating, the resin solution may have a solid content of 10%-30% solids. The composition of the resin solution may include one or more thermoset resin(s) in the form of dispersed solids, at least one curing agent, and a solvent. The thermoset resin(s) and curing agent are as described above for the resin material. The solvent may be selected from organic solvents such as methyl ethyl ketone (MEK), acetone, dimethylacetamide, and N-methylpyrrolidone. Optionally, a thermoplastic polymer may be added as a toughener to the resin solution in an amount of up to 10-40 parts per 100 parts of thermoset resin in total (all thermoset resins combined). Parts are measured in weight.

Solid Binder

For the configurations shown in FIGS. 3 and 4, a solid binder may be used instead of the curable resin material disclosed above. This solid binder may be distributed in particulate form, e.g., as a powder, onto the veil(s) and/or the porous conductive layer followed by lamination. The term "particulate form" in this context means in the form of separate particles. The particles could have any shape such as flakes or other non-spherical shapes. The resulting laminate is then bonded to the reinforcement textile, which itself contains a small amount of binder.

As disclosed above, the binder is a solid at a temperature of up to 50° C., has a softening point at a temperature in the range of 65° C. to 125° C. as measured by Differential Scanning calorimetry (DSC), and comprises a blend of epoxy resin and thermoplastic polymer, but is void of any catalyst or cross-linking agent which is active above 65° C. The epoxy resin may be selected from those disclosed for the curable resin composition. The thermoplastic polymer in the epoxy-thermoplastic blend may be a polyarylsulphone polymer that is soluble in epoxy resin. Such polyarylsulphone polymer contains ether-linked repeating units and optionally thioether-linked repeating units, the units being selected from:

$$-(Ph-A-Ph)_n-$$

and optionally $$-(Ph)_a-$$

wherein A is CO or $SO_2$, Ph is phenylene, n=1 to 2 and can be fractional, a=1 to 4 and can be fractional, provided that when a exceeds 1, the phenylenes are linked linearly through a single chemical bond or a divalent group other than —CO— or —$SO_2$—, or are fused together directly or via a cyclic moiety selected from the group consisting of an acid alkyl group, a (hetero) aromatic, a cyclic ketone, a cyclic amide, an imide, a cyclic imine and combinations thereof.

The polyarylsulphone may contain repeating units of —($PhSO_2Ph$)—, wherein the —($PhSO_2Ph$)— unit is present in the polyarylsulphone in such a proportion that on average at least two of said unit —($PhSO_2Ph$)— are in sequence in each polymer chain present.

Preferably, the polyarylsulphone is a copolymer containing the following units:

$$X-Ph-SO_2-Ph-X-PhSO_2Ph(\text{"PES"}) \text{ and} \quad (I)$$

$$X-(Ph)_a-X-PhSO_2Ph(\text{"PEES"}) \quad (II)$$

wherein X is O or S and may differ from unit to unit, and a is 1-4.

The method for making this solid binder may be found in U.S. Pat. No. 8,927,662, assigned to Cytec Technology Corp., the content of which is incorporated herein by reference.

Reinforcement Textile

In the embodiments of FIGS. 3 and 4, the reinforcement textile 15 is a dry, fluid permeable material, which includes a nonwoven veil bonded to at least one side of a layer of unidirectional (UD) fibers, and a small amount of binder sufficient for bonding the UD fibers to the veil. The total amount of binder in the reinforcement textile is about 15% or less by weight, e.g., 0.1% to 15% by weight, based on the total weight of the reinforcement textile. The UD fibers and the nonwoven veil constitute greater than 80% by weight based on the total weight of the reinforcement textile. The binder in the reinforcement textile does not form a continuous film on the nonwoven veil or across the UD fibers. As such, the reinforcement textile is porous and permeable to liquid resins to be used in resin infusion.

The UD fibers are aligning in parallel, in the same direction, with spacing between adjacent fibers. Suitable UD fibers include glass fibers, carbon (including graphite) fibers, and aramid fibers (e.g., Kevlar).

The nonwoven veil is composed of randomly arranged fibers, which may include thermoplastic fibers or carbon fibers, or combination of carbon fibers and thermoplastic fibers. The fiber length may vary from ⅛ in (0.32 cm) to 2 in (5.08 cm) long. The areal weight of the nonwoven veil in this embodiment is preferably 10 gsm or less, e.g. 2-10 gsm.

For nonwoven veils composed of thermoplastic fibers, the fibers may be made of a thermoplastic material selected from: polyamides, including aliphatic polyamides, cycloaliphatic polyamides, and aromatic polyamides; polyphthalamides; polyamidoimides; polyimides; polyetherimides, polyesters; polyphenyleneoxides; polyurethanes; polyacetals; polyolefins; polyarylsulfones including polyethersulfone, polyetherethersulfone; polyaryletherketones (PAEK) including polyetheretherketone (PEEK) and polyetherketoneketone (PEKK); poly(phenylenesulfide); liquid crystal polymers (LCP); phenoxys; acrylics; acrylates; mixtures and copolymers thereof. Moreover, the nonwoven veil may be composed of two different types of fibers, i.e., fibers having different thermoplastic compositions.

Suitable binders for the reinforcement textile includes: polyurethane, which is non-crosslinked, partially or fully crosslinked, or modified polyurethane polymer; partially or fully cross-linked copolymer of polyhydroxyether and polyurethane; epoxy, which is non-crosslinked, partially or fully crosslinked, or modified epoxy; poly(hydroxyether) resin, which is non-crosslinked, partially or fully crosslinked.

The binder for use in the reinforcement textile may also be the same solid binder composed of epoxy resin and thermoplastic polymer as disclosed above in reference to the configurations of FIGS. 3 and 4.

In one embodiment, the binder is a water-borne dispersion containing: (i) a copolymer of polyhydroxyether and polyurethane, (ii) a cross-linker; and optionally, (iii) a catalyst. The cross-linker may be an aminoplast cross-linker, for example, methoxyalkyl melamine class of aminoplast cross-linkers. The catalyst may include, but are not limited to, proton donating acids such as carboxylic, phosphoric, alkyl acid phosphates, sulfonic, di-sulfonic acids and/or Lewis acids such as aluminum chloride, bromide or halide, ferric halide, boron tri-halides, and many others in both categories as is well known to one skilled in the art.

An exemplary method for applying the binder includes: applying a binder, in particulate form or liquid form, to the layer of spread UD fibers and/or the nonwoven veil; and bonding the nonwoven veil to at least one side of the fiber layer. In another exemplary method, the binder is added during the fabrication of the nonwoven veil. The resulting binder-containing veil is then bonded to the UD fiber layer.

According to one embodiment, the method for manufacturing the reinforcement textile includes: applying a first binder, in powder form, to a dry fiber web of spread UD fibers (e.g., carbon fibers) and/or a nonwoven veil (e.g., composed of carbon fibers and/or thermoplastic fibers); bonding the nonwoven veil to at least one side of the fiber web to form a laminate; applying a second binder, in the form of a liquid composition, to the laminate, e.g. by dip coating; and drying the binder-treated laminate in an oven.

Application in Resin Infusion Process

The LSP materials disclosed herein are configured for use in resin infusion processes such as RTM and VARTM. Generally, the LSP material is applied on an outer surface of a fibrous preform in the shape of a composite part, and the combined assembly is infused with resin. After the resin-infused preform is cured to form a hardened composite structure, the LSP material becomes an integrated part of the cured structure.

For the LSP material shown in FIG. 1, the LSP material is placed on the preform to be infused with resin such that the resin-containing veil 11 is the outer most layer prior to resin infusion. For the LSP material shown in FIG. 2, either one of the resin-containing veils (11 or 14) can be in contact with the preform to be infused with resin. For the LSP materials shown in FIGS. 3 and 4, the reinforcement textile 15 is in contact with the preform to be infused with resin.

The preform disclosed herein consists of an assembly or a lay-up of multiple layers of dry reinforcement fibers. The layers of reinforcement fibers in the preform may be any type of textiles known in the prior art for manufacturing composite materials. Examples of suitable fabric types or configurations include, but are not limited to: all woven fabrics, including plain weave, twill weave, sateen weave, spiral weave, and uni-weave; all multiaxial fabrics, examples of which include, warp-knitted fabrics, and non-crimp fabrics (NCF); knitted fabrics; braided fabrics; all non-woven fabrics, examples of which include non-woven mats composed of chopped and/or continuous fiber filaments, and felts; and combinations of the aforementioned fabric types. For certain applications, the preform may contain a porous foam core or honeycomb core between two stacks of fiber layers.

The reinforcement fibers for the preform may be made of materials selected from, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof.

The preform may be prepared by an automated placement process such as ATL or AFP, in which a plurality of fiber tapes are laid down side-by-side to form a fiber layer of desired dimensions, and subsequent layers are laid down in the same manner to build up a layup of desired thickness. The LSP materials of the present disclosure can be incorporated into such automated placement process to form the first layer on a tool surface before the fiber layers are laid down or as the last layer after the preform layup has been formed.

Figure 5:
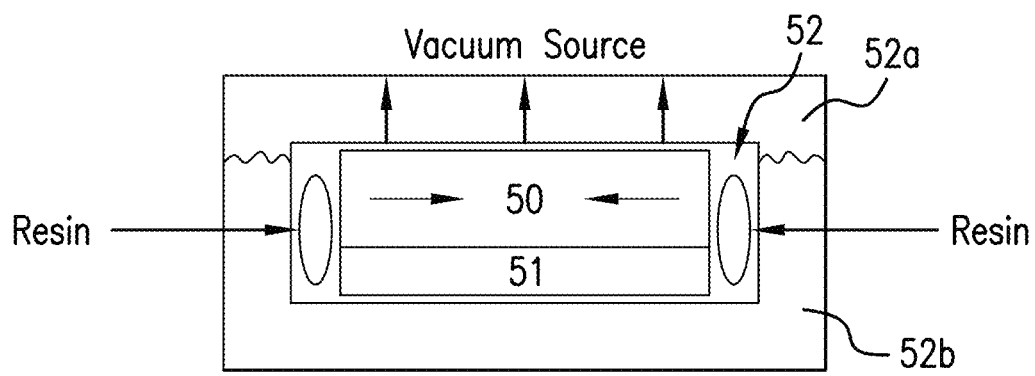
FIG. 5 illustrates an exemplary closed-mold RTM method.

FIG. 5 illustrates an exemplary closed-mold RTM method, in which an assembly of a dry, fibrous preform 50 (a layup of fiber layers) and a LSP material 51 is placed in an enclosed mold cavity 52 of a molding tool, and then resin is injected into the cavity under pressure. The mold cavity 52 is defined by two or more die parts, for example, an upper die part 52a and a lower die part 52b as shown in FIG. 5. At least one of the die parts contains a temperature control mechanism to adjust the temperature of the molding tool. The mold cavity 52 is in fluid communication with resin injection lines (not shown) and connected to a vacuum source via a vacuum line (not shown). The resin injection lines and the vacuum line are disposed in such a way that the resin flows through the LSP material 51 and through the thickness of the preform 50. The LSP material 51 is according to any one of the embodiments shown in FIGS. 1-4. During operation, the molding tool is clamped closed, heated and evacuated, then liquid resin, in a pressurized condition, is injected via resin lines into the mold cavity 52. Once resin infusion of the preform is completed, the mold cavity is heated while maintaining high pressure to cure the resin-infused preform, thereby forming a cured and hardened composite structure with an integrated LSP material.

After curing, the molding tool is opened, and the cured composite structure is removed from the molding tool.

Figure 6:
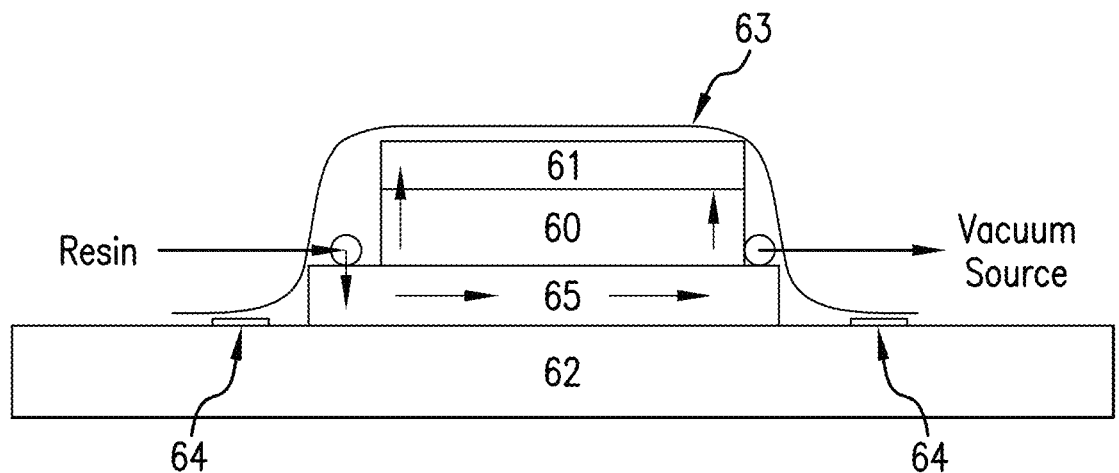
FIG. 6 illustrates an exemplary VARTM method.

FIG. 6 illustrates an exemplary VARTM method, in which an assembly of a fibrous preform 60 and a LSP material 61 is enclosed between a one-sided molding tool 62 and a flexible, gas impermeable sheet or "vacuum bag" 63. The vacuum bag 63 is sealed to the tool 62 by sealing elements 64. The enclosed vacuum bag is in communication with a resin supply line (not shown), which may contain a series of conduits, and a vacuum line (not shown). A resin distribution mesh 65 is placed between the preform 60 and the tool 62 and is in contact with the resin supply line to enhance the distribution of the resin into the preform. In an alternative embodiment, the LSP material 61 is in contact with the resin distribution mesh 65 instead of preform 60.

During VARTM operation, a relative vacuum is drawn between the tool 62 and the vacuum bag 63, thereby causing the bag to compress against the LSP material/preform assembly. Liquid resin is introduced into the evacuated bag through the resin supply line. A multitude of individual resin supply lines may be used so as to facilitate complete wetting or infusion of the liquid resin into the entire preform. The vacuum line and the resin supply line(s) are strategically positioned relative to one another in a manner which enables resin infusion through the thickness of the LSP material/preform assembly to saturate the entire assembly. In this respect, the vacuum source may be applied at one side of the assembly and the resin introduced at an opposing side as shown in FIG. 6.

Figure 7:
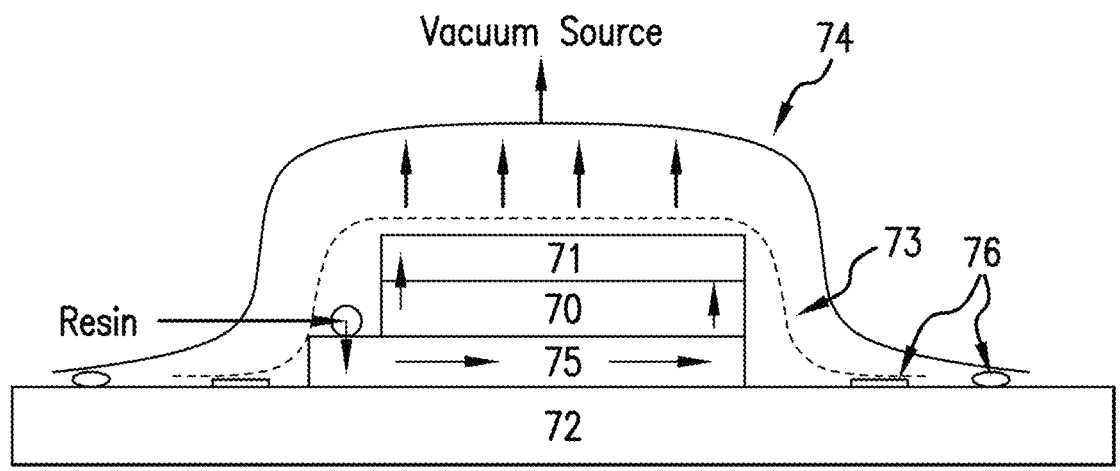
FIG. 7 illustrates another exemplary VARTM method.

FIG. 7 illustrates another exemplary VARTM method, in which an assembly of preform 70 and LSP material 71 is enclosed between a molding tool 72 and a flexible, gas-permeable membrane 73. The gas-permeable membrane 73 contains tiny pores throughout and is permeable to gas but is not permeable to liquid resin. The gas-permeable membrane 73 is enclosed by an outer gas-impermeable cover or vacuum bag 74. Sealing elements 76 are provided to seal each of the gas-permeable membrane 73 and the vacuum bag 74 to the tool 72. A resin distribution mesh 75 is placed between the preform 70 and the tool 72 and is in contact with the resin supply line to enhance the distribution of the resin into the preform 70. In an alternative embodiment, the LSP material 71 is in contact with the resin distribution mesh 75 instead of preform 70. A vacuum source is connected to the space between the gas-permeable membrane 73 and the vacuum bag 74.

In operation, vacuum is drawn from the space between the vacuum bag 74 and the tool 72, thereby causing the bag to compress against the LSP material/preform assembly. Liquid resin is introduced into the LSP material/preform assembly via the resin supply line and with the aid of the resin distribution mesh 75. Due to vacuum pressure, the resin is pulled through the thickness of the LSP material/preform assembly, but the gas-permeable membrane 73 prevents the resin from flowing into the space between the gas-permeable membrane 73 and the vacuum bag 74.

It should be understood that FIGS. 5-7 merely illustrate how the LSP materials of the present disclosure can be used in resin infusion processes. The use of the LSP materials disclosed herein is not limited to any specific arrangement of RTM or VARTM.

EXAMPLES

Example 1

Figure 8:
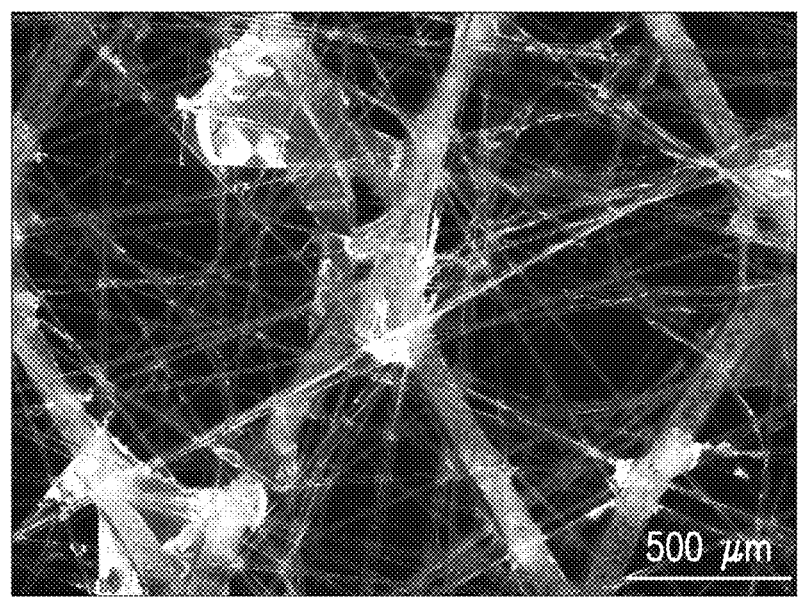
FIG. 8 is a top-view image of a permeable LSP structure produced according to one example.

FIG. 8 is a top view image (at ×50 magnification) showing a permeable LSP structure that was formed by laminating a 10 gsm nonwoven glass veil and 26 gsm epoxy-based resin film under vacuum and heat in a first stage, then laminating the resin-infused veil to a 73 gsm expanded copper foil (or copper mesh) under vacuum and heat.

Example 2

A permeable LSP material was formed by combining a 195 gsm expanded copper foil (ECF), two glass veils (10 gsm each), and two epoxy-based films of SM905C (50 gsm each) such that the ECF is sandwiched between the two glass veils and the epoxy-based films are the outermost layers, followed by lamination of the assembly was carried out under vacuum and heat. A dry preform was formed by laying up 16 plies of NCF fabric plies (268 gsm each ply), arranged in a quasi-isotropic, symmetric layup. The LSP material was placed on the dry preform and the whole assembly was infused with epoxy-based resin composition at 90° C. in a VaRTM set up. The preform was fully infused in 3 min and about 136 g of resin was used. The resin-infused preform was cured for 120 min at 180° C. to form a hardened composite panel.

Figure 9:
FIG. 9 shows a cross-sectional view of a cured composite panel with an embedded LSP material that was prepared according to one example.

FIG. 9 shows the cross-section of the cured composite panel with embedded LSP material.

Example 3

A permeable LSP material was formed as described in Example 2 except that a 73 gsm ECF was used. The LSP material was placed on a dry preform composed of 16 plies of NCF (268 gsm each ply), and the whole assembly was infused with an epoxy-based resin composition at 90° C. in a VaRTM set up. The preform was fully infused in 3 min and about 134 g of resin was used. The resin-infused preform was cured for 120 min at 180° C. to form a hardened composite panel.

Figure 10:
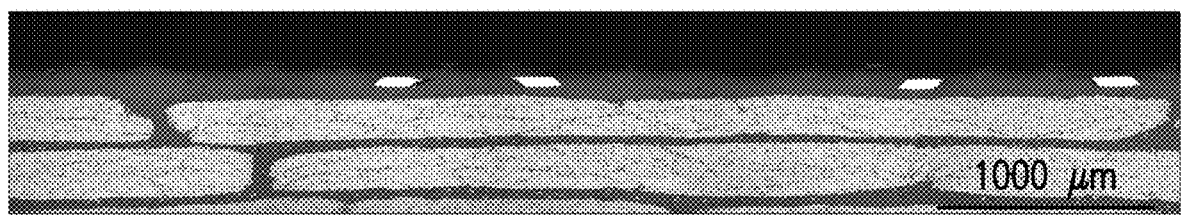
FIG. 10 shows a cross-sectional view of a cured composite panel with an embedded LSP material that was prepared according to another example.

FIG. 10 shows the cross-section of cured composite panel with embedded LSP material.

What is claimed is:

1. A permeable material that is porous and permeable to fluids, comprising:
   a. a first nonwoven veil comprising randomly arranged fibers;
   b. a porous electrically conductive layer having openings through its thickness; and
   c. a resin material distributed, in a non-continuous manner, throughout the first nonwoven veil and between the first nonwoven veil and the conductive layer in a manner such that the first nonwoven veil remains porous and most or all of the openings in the conductive layer are not blocked by the resin material,
   wherein the porous electrically conductive layer comprises two opposing surfaces and the first nonwoven veil is adhered to one of the opposing surfaces, and
   wherein the resin material comprises one or more thermoset resins and a curing agent.

2. The permeable material of claim 1 further comprising:
   d. a second nonwoven veil comprising randomly arranged fibers,
   wherein the second nonwoven veil is adhered to the other opposing surface of the porous electrically conductive layer, and the resin material is distributed throughout the second nonwoven veil in a non-continuous manner such that the second nonwoven veil remains porous.

3. The permeable material of claim 1, further comprising a reinforcement textile comprising a second nonwoven veil bonded to a layer of unidirectional fibers, wherein either the second nonwoven veil or the layer of unidirectional fibers is adhered to the other opposing surface of the porous electrically conductive layer, and wherein the reinforcement textile is porous and permeable to fluids.

4. The permeable material of claim 2, further comprising a reinforcement textile comprising a third nonwoven veil bonded to a layer of unidirectional fibers, wherein either the third nonwoven veil or the layer of unidirectional fibers is adhered to the second nonwoven veil, and wherein the reinforcement textile is porous and permeable to fluids.

5. The permeable material of claim 1, wherein the resin material is present in an amount in the range of 20 gsm to 75 gsm, or 25 gsm to 50 gsm.

6. The permeable material of claim 2, wherein the resin material is present in an amount in the range of 40 gsm to 150 gsm, or 50 gsm to 100 gsm.

7. The permeable material of claim 1, wherein the resin material comprises one or more multifunctional epoxy resins and an amine compound as curing agent, and optionally, a toughening agent selected from: thermoplastic polymers, elastomers, core-shell rubber (CSR) particles, a pre-react adduct which is a reaction product of an epoxy resin, a bisphenol, and an elastomeric polymer, and combinations thereof.

8. The permeable material of claim 1, wherein the first nonwoven veil has an areal weight in the range of 3 to 50 gsm.

9. The permeable material of claim 2, wherein the second nonwoven veil has an areal weight in the range of 3-50 gsm.

10. The permeable material of claim 1, wherein the first nonwoven veil comprising fibers formed of glass, carbon, or polymer(s).

11. The permeable material of claim 1, wherein the porous electrically conductive layer is a metal mesh or metal screen, or perforated metal foil.

12. The permeable material of claim 1, wherein the porous electrically conductive layer has an areal weight in the range of 50 gsm to 850 gsm.

13. The permeable material of claim 1, wherein the porous electrically conductive layer comprises a metal selected from copper, aluminum, bronze, titanium, alloys and combinations thereof.

14. The permeable material of claim 3, wherein the nonwoven veil in the reinforcement textile comprises carbon fibers or thermoplastic fibers, or a mixture of carbon fibers and thermoplastic fibers, and the unidirectional fibers in the reinforcement textile are carbon fibers.

15. The permeable material of claim 1, wherein the permeable material is in the form of an elongated or continuous tape having a width in the range of about 0.125 in to about 12 in (or about 3.17 mm to about 305 mm) and a length of at least 10 times.

* * * * *